3,096,313
COPOLYMER OF METHYL METHACRYLATE AND GLYCIDYL METHACRYLATE
Edwin Benjamins and Barnard Mitchel Marks, Wilmington, Del., assignors to E. I. du Pont de Nemours and Company, Wilmington, Del., a corporation of Delaware
No Drawing. Filed May 20, 1958, Ser. No. 736,444
1 Claim. (Cl. 260—86.1)

This invention relates to a process for the preparation of thermoplastic molding compositions and more particularly provides polymeric alkyl methacrylate compositions having improved melt viscosity and improved performance in injection-molding and extrusion at elevated temperatures. This application is a continuation-in-part of S.N. 473,034, filed December 3, 1954, now abandoned.

In the plastic arts, a large number of articles are manufactured by the injection-molding and extrusion of thermoplastic materials such as the polymers of the acrylic and methacrylic acid esters. Extrusion is carried out by the continuous discharge of the molten polymer through dies for the preparation of filaments, sheets, tubes, bars, and the like, while in injection-molding the molten polymer is discharged intermittently into molds for the preparation of articles of various shapes such as automotive decorative parts, reflecting lenses, toys, and the like.

The commercial acceptability of any thermoplastic material for molding or extrusion purposes turns on price considerations which are governed, other things being equal, by the rate at which the article can be made. If, for example, filaments, tubes, and the like are to be formed continuously, the rate at which they issue from an extrusion die in feet per minute must be competitive. Moreover, if the intermittent injection-molding type of extrusion is contemplated, it is essential for economical operation that the time cycle be reduced to a minimum.

One of the characteristics of polymeric methyl methacrylate is that upon being heated to melt temperatures, there is a tendency for the polymeric ester to depolymerize into monomer fragments to a limited extent during a normal molding cycle. The presence of monomeric material reduces melt viscosity during injection-molding cycles and reduces output owing to the increased time the loading piston must hold the polymer in the mold in order that it be ejected as a form stable object. Moreover, melt strength of polymeric methyl methacrylate has been found, by research leading up to the invention, to be reduced, inter alia, by this reduced viscosity. The present invention is directed to providing polymeric alkyl methacrylate molding and extrusion compositions and the like, which overcome many of the aforesaid and related disadvantageous properties of the polymers heretofore used.

An object of the present invention is to provide polymeric alkyl methacrylate compositions having stabilized melt viscosities. Another object of the invention is to provide a polymeric methyl methacrylate composition which, upon being heated to melt temperatures, resists reduction in viscosity due to depolymerization of the polymeric ester. Still another object is to provide a methyl methacrylate composition having high melt strength. Yet another object is to provide a thermoplastic molding composition having viscosity and thermal stability that can be injection-molded at high rates. Other objects and advantages of the invention will hereinafter appear.

Many different compounds containing olefinic unsaturation, including the esters of acrylic, methacrylic, and crotonic acids, as well as the various molding and extrudable compositions of such monomers copolymerized with other monomeric compounds, are described in the art for use as thermoplastic molding compositions. The Dorough patent, U.S. 2,524,432, describes copolymers prepared from esters of epoxy alcohols with propenoic compounds. The Erickson patent, U.S. 2,556,075, likewise describes copolymers made from polymerizable compounds and the epoxy alcohol esters of acrylic and methacrylic acids. Erickson points out that during molding, cross-linking takes place as a result of opening up of the oxirane ring of the reactive polymer under the heat of molding and/or the influence of polymerization catalysts. Erickson et al., in their U.S. Patent 2,580,901, disclose copolymerization of, for example, glycidyl methacrylate with "styrene, vinyl acetate, ethyl acrylate, dialkyl phthalate, acrylonitrile, acrylamide, etc.," and they note that as little as 0.5% of the glycidyl ester causes a marked change in properties. These investigators, however, neither disclose the influence of glycidyl esters on the melt stability of an acrylate or alkacrylate polymer composition, nor that melt viscosity, melt strength, or injection moldability would be improved by its use in amounts less than 0.5%.

In contradistinction to the teachings of the art and the aforesaid patents, the present invention relates to the discovery that, with minor amounts of an epoxy alcohol ester of an acrylic or alkacrylic acid copolymerized with a major amount of an alkyl acrylate and/or alkacrylate, there results a thermoplastic product that gives a polymeric composition having high gel strength and superior viscosity and thermal stability. The presence of the small amount of an epoxy alcohol ester segment in the polymer molecule makes it possible to provide a molding composition that not only can be melt-extruded at remarkably high temperatures without reduction in or instability of melt viscosity and extruded at a higher rate of production, but also can be injection-molded on a reduced time cycle.

Three serious problems, inter alia, of injection-molding are solved by the instant invention, all of which are primarily concerned with the stability of the molten polymer while in the molten state and during its transition from the molten to the solid state. The first is melt stability. Methyl methacrylate polymers of the art depolymerize at melt temperatures. This characteristic lowers melt viscosity which increases the length of time the charging piston of an injection-molding machine must hold the polymer in the mold to avoid back flow of the polymer from the mold. Back flow is to be avoided for it gives partially filled molds, bubbles, and reduced weight of the article produced. To overcome back flow due to melt instability, compositions of the art have been modified, but such modifications, while they have restricted back flow, they have reduced thermal stability. The second is thermal stability of the finished article. This property of methyl methacrylate polymers is of considerable practical importance and concerns the ability of the polymer to withstand high temperatures without structural deformation. The third is what has been called strength of melt. This is a property of polymeric compositions, the cause of which has not been fully characterized. It is measurable, however by the pressure required to prevent the formation of bubbles during the solidification of a melt. The methacrylate ester and other polymer compositions of the invention are, to a large extent, free from these disadvantageous properties of prior art compositions.

The thermoplastic composition of the invention should contain from about 0.01% up to no more than about 0.4% of an epoxy ester group attached to the methacrylate polymer chain, based on the weight of polymer, and preferably from 0.05% to about 0.20% of the epoxy ester on the same basis. By increasing the amount of epoxy ester groups above the top designated limit, undesirable cross-linking results to form infusible and insoluble polymeric products, if not impossible to mold, at least difficult to mold by extrusion or injection-molding at acceptable commercial rates of production. The thermoplastic compositions of the invention may be made in any suitable manner. The preferred method, however, is to combine monomers of methyl methacrylate and the epoxy alcohol methacrylate or acrylate in proper proportions to give the aforesaid epoxy ester groups and then to copolymerize the resulting mixture. The resulting copolymer would, of course, be made from the proper ratio of monomers to give the aforesaid ratio. In any case it is, of course, essential that there be present in the thermoplastic composition the prescribed amount of the epoxy ester, i.e., between 0.01% to 0.4% based on the major polymer constituent or constituents of the composition.

A preferred thermoplastic composition of the invention may be made in accord with this process:

Into a stainless steel container provided with a stirrer, these ingredients are introduced:

| | Parts |
|---|---|
| Water | 1800 |
| Methyl methacrylate | 960 |
| Ethyl acrylate | 15 |
| Sodium polymethacrylate | 0.5 |
| Methyl salicylate | 2.0 |
| Azo-bis-isobutyronitrile | 3.0 |
| Glycidyl methacrylate | 3.0 |
| Lauryl mercaptan | 1.3 |

The mixture is adjusted wtih sodium acid phosphate or phosphoric acid to a pH of 6.0 after the addition of 5 parts of sodium polymethacrylate, and then heated to 65° C. with stirring, the pressure developed being relieved by venting. The vessel is then closed, heated to about 90° C., and the reaction allowed to continue with cooling so as to maintain a pressure of about 16 p.s.i. After the temperature reaches a peak of about 105° C., 30 grams of lauryl mercaptan is added. The granular product is discharged (after releasing the pressure), washed, and dried.

The examples in the table below illustrate the effect of glycidyl methacrylate content on melt viscosity stability of a copolymer containing greater than 99% of alkyl acrylates and alkyl methacrylates. The examples cited are similar to the formula above and differ chiefly in glycidyl methacrylate content.

Table

| Glycidyl Methacrylate, Percent | Melt Flow, g./10 min. at 260° C.[1] After Hold-Up Time of— | | Change on Flow During Hold-Up, Percent |
|---|---|---|---|
| | 7 Min. | 30 Min. | |
| 0 | 5.1 | 7.9 | +55 |
| 0.1 | 5.7 | 7.7 | +35 |
| 0.2 | 5.4 | 6.1 | +13 |
| 0.4 | 4.4 | 4.0 | −9 |

[1] A.S.T.M. D-1238 52-T methyl with 3760 g. load and .052 dia. orifice

The invention contemplates more especially the use, in the preparation of a thermoplastic molding composition, of a polymer of a monovinyl-containing compound or a copolymer produced from such a compound with a similar or dissimilar polymerizable compound, which polymer or copolymer contains an epoxy ester group substituent in the specified ratio. Examples of the epoxy alcohols and ester forming derivatives thereof which are suitable for use in the practice of the invention are epoxy-octadecanol, epoxydodecanol, 5,6-epoxyhexanol-2, 3,4-epoxy-2,2,4-trimethyl pentanol-3, beta-hydroxy ethyl ethylene oxide, 3-hydroxy-1,2-oxidocyclohexane, alpha-hydroxy-methyl-alpha-phenylethylene oxide, 3,4-dihydroxybenzyl ethylene oxide, and the like.

Examples of the monovinyl-containing polymerizable compounds that are copolymerized with the aforesaid epoxy alcohol unsaturated esters include the polymer-forming, unsaturated acids or their ester derivatives generally. They include, in addition to the more specific embodiments of the invention, vis., the methyl esters of the alkacrylic acids, the higher alkyl esters of those acids, such as ethyl, the propyl, the butyl, and higher esters. Alternatively, the aforesaid monomers, when copolymerized with methyl methacrylate, may contain the designated ratio of epoxy substituent groups.

A further feature of the invention is the discovery that additional reactions of the epoxy acrylate or alkacrylate, resulting in increased viscosity, are accelerated by the presense of certain agents in the melt. These agents include compounds that are acidic, that hydrolyze, or otherwise react during the melt stage to form acids or acidic fragments. Examples of these agents are the hydroxy esters of acrylic and methacrylic acids, esters of hydroxy acids and alkoxy acids, such as methyl salicylate and similar agents that are compatible with the molding composition.

While the invention is more particularly directed to thermoplastic moldable compositions of polymeric methyl methacrylate containing epoxy alcohol ester groups; nevertheless, other thermoplastic acrylic and alkacrylic acid ester compositions containing epoxy alcohol ester groups come within the scope of the invention as defined by the claim.

We claim:

A thermoplastic composition having improved melt viscosity stability, melt strength, and injection moldability consisting essentially of a copolymer of methyl methacrylate and glycidyl methacrylate containing from 0.01% to 0.40% by weight of copolymerized glycidyl methacrylate units.

References Cited in the file of this patent

UNITED STATES PATENTS

| 2,470,324 | Staudinger et al. | May 17, 1949 |
| 2,476,922 | Shokal et al. | July 19, 1949 |
| 2,580,901 | Erickson et al. | Jan. 1, 1952 |